(12) United States Patent
Foster

(10) Patent No.: US 8,891,960 B2
(45) Date of Patent: Nov. 18, 2014

(54) OPTICAL DATA COMMUNICATIONS

(75) Inventor: Charles Foster, Henley-on-Thames (GB)

(73) Assignee: PacketFront Systems AB, Kista (SE)

( * ) Notice: Subject to any disclaimer, the term of this patent is extended or adjusted under 35 U.S.C. 154(b) by 760 days.

(21) Appl. No.: 12/682,323

(22) PCT Filed: Oct. 10, 2008

(86) PCT No.: PCT/EP2008/063667
§ 371 (c)(1),
(2), (4) Date: Aug. 4, 2010

(87) PCT Pub. No.: WO2009/047345
PCT Pub. Date: Apr. 16, 2009

(65) Prior Publication Data
US 2010/0303458 A1  Dec. 2, 2010

(30) Foreign Application Priority Data

Oct. 12, 2007  (EP) .................................. 07118419

(51) Int. Cl.
H04B 10/08   (2006.01)
H04L 29/06   (2006.01)
H04L 12/413  (2006.01)

(52) U.S. Cl.
CPC .............. H04L 12/413 (2013.01); H04L 69/18 (2013.01)
USPC .................. 398/33; 398/25; 398/38; 398/155; 398/135; 398/136; 370/463; 370/465; 370/433

(58) Field of Classification Search
USPC ........... 398/66, 67, 68, 69, 70, 71, 72, 79, 98, 398/99, 100, 25, 33, 164, 135, 136, 137, 398/138, 155, 151, 139, 154, 58, 59, 38, 398/158, 159; 370/433, 465, 242, 247, 248, 370/278, 462, 461, 252, 463
See application file for complete search history.

(56) References Cited

U.S. PATENT DOCUMENTS 5,586,255 A   12/1996   Tanaka et al.
5,659,736 A   8/1997    Hasegawa et al.

(Continued)

FOREIGN PATENT DOCUMENTS

EP   1 039 698   9/2000
EP   1780941     5/2007

(Continued)

OTHER PUBLICATIONS

International Search Report and Written Opinion for PCT/EP2008/056565, mailed Jan. 19, 2009.

(Continued)

*Primary Examiner* — Hanh Phan
(74) *Attorney, Agent, or Firm* — Faegre Baker Daniels LLP

(57) ABSTRACT

A method of communicating data between a network device and a data network to which the device is connected via an optical fiber data link in which the device is connected to the optical fiber data link and the connection is monitored to detect data communication at a first standard. If data communication is detected at the first standard, data communication is established using the first standard. If not, the connection is monitored at the second standard. If data communication is detected at the second standard, data communication is established using the second standard.

17 Claims, 2 Drawing Sheets

(56) References Cited

U.S. PATENT DOCUMENTS

| | | | |
|---|---|---|---|
| 5,684,988 A | 11/1997 | Pitchaikani et al. | |
| 5,689,598 A | 11/1997 | Dean, Jr. et al. | |
| 5,802,042 A | 9/1998 | Natarajan et al. | |
| 5,832,503 A | 11/1998 | Malik et al. | |
| 5,913,037 A | 6/1999 | Spofford et al. | |
| 6,028,769 A | 2/2000 | Zurek | |
| 6,059,614 A | 5/2000 | Shelby et al. | |
| 6,122,639 A | 9/2000 | Babu et al. | |
| 6,222,852 B1* | 4/2001 | Gandy | 370/463 |
| 6,233,616 B1 | 5/2001 | Reid | |
| 6,286,038 B1 | 9/2001 | Reichmeyer et al. | |
| 6,393,472 B1 | 5/2002 | Anerousis et al. | |
| 6,430,621 B1 | 8/2002 | Srikanth et al. | |
| 6,560,236 B1 | 5/2003 | Varghese et al. | |
| 6,594,070 B2* | 7/2003 | Sugata et al. | 359/326 |
| 6,639,901 B1 | 10/2003 | Katzri et al. | |
| 6,680,945 B1 | 1/2004 | Merchant et al. | |
| 6,769,124 B1 | 7/2004 | Schoening et al. | |
| 6,839,749 B1 | 1/2005 | Bera | |
| 6,876,667 B1 | 4/2005 | Synnestvedt et al. | |
| 6,885,657 B1 | 4/2005 | Rabenko et al. | |
| 6,954,436 B1 | 10/2005 | Yip et al. | |
| 6,958,996 B2 | 10/2005 | Xiong | |
| 7,054,309 B1 | 5/2006 | Hoot et al. | |
| 7,076,177 B1* | 7/2006 | Yang et al. | 398/208 |
| 7,082,463 B1 | 7/2006 | Bradley et al. | |
| 7,099,158 B1 | 8/2006 | Bjorklund | |
| 7,139,818 B1 | 11/2006 | Kinnear, Jr. et al. | |
| 7,200,145 B1 | 4/2007 | Edsall et al. | |
| 7,218,827 B2 | 5/2007 | Vongseng et al. | |
| 7,222,359 B2 | 5/2007 | Freund et al. | |
| 7,290,046 B1 | 10/2007 | Kumar | |
| 7,293,077 B1 | 11/2007 | Teo et al. | |
| 7,352,853 B1 | 4/2008 | Shen et al. | |
| 7,386,629 B2 | 6/2008 | Rover et al. | |
| 7,467,229 B1 | 12/2008 | Biggs et al. | |
| 7,581,024 B1 | 8/2009 | Yip et al. | |
| 7,640,287 B1 | 12/2009 | Gai et al. | |
| 7,640,340 B1 | 12/2009 | Stapp et al. | |
| 7,672,596 B2* | 3/2010 | Irie | 398/155 |
| 7,702,732 B1 | 4/2010 | Squire et al. | |
| 7,711,826 B2 | 5/2010 | Ford | |
| 7,760,984 B2 | 7/2010 | Solheid et al. | |
| 7,788,345 B1 | 8/2010 | Sukiman et al. | |
| 7,801,133 B2 | 9/2010 | Siegel | |
| 7,826,463 B2 | 11/2010 | Patel et al. | |
| 7,844,181 B2* | 11/2010 | Natarajan et al. | 398/79 |
| 7,929,452 B2 | 4/2011 | Diamant et al. | |
| 7,945,164 B2* | 5/2011 | Theodoras, II | 398/79 |
| 7,948,993 B2 | 5/2011 | Kini et al. | |
| 7,966,409 B1 | 6/2011 | Daruwalla et al. | |
| 7,969,880 B2 | 6/2011 | Yano et al. | |
| 7,983,190 B2 | 7/2011 | Hirota | |
| 7,990,994 B1 | 8/2011 | Yeh et al. | |
| 8,054,804 B2 | 11/2011 | Small et al. | |
| 8,098,659 B2 | 1/2012 | Shida | |
| 2002/0023174 A1 | 2/2002 | Garrett et al. | |
| 2002/0075844 A1 | 6/2002 | Hagen | |
| 2002/0103878 A1 | 8/2002 | Moncibais | |
| 2002/0161801 A1 | 10/2002 | Hind et al. | |
| 2003/0039249 A1 | 2/2003 | Basso et al. | |
| 2003/0056225 A1 | 3/2003 | Bione | |
| 2003/0131107 A1 | 7/2003 | Godse et al. | |
| 2003/0165140 A1 | 9/2003 | Tang et al. | |
| 2003/0200285 A1 | 10/2003 | Hansen et al. | |
| 2003/0206548 A1 | 11/2003 | Bannai et al. | |
| 2003/0217077 A1 | 11/2003 | Schwartz et al. | |
| 2004/0003060 A1 | 1/2004 | Asoh et al. | |
| 2004/0008710 A1 | 1/2004 | Parra-Moyano et al. | |
| 2004/0013126 A1* | 1/2004 | Yun | 370/433 |
| 2004/0017829 A1 | 1/2004 | Gray et al. | |
| 2004/0047353 A1 | 3/2004 | Umayabashi et al. | |
| 2004/0049568 A1 | 3/2004 | Nguyen et al. | |
| 2004/0052216 A1 | 3/2004 | Roh | |
| 2004/0090965 A1 | 5/2004 | Lin | |
| 2004/0128367 A1 | 7/2004 | Piercy et al. | |
| 2004/0160464 A1 | 8/2004 | Reyna | |
| 2004/0172412 A1 | 9/2004 | Files et al. | |
| 2004/0213152 A1 | 10/2004 | Matuoka et al. | |
| 2004/0258074 A1 | 12/2004 | Williams et al. | |
| 2004/0267949 A1 | 12/2004 | Rover et al. | |
| 2005/0044265 A1 | 2/2005 | Vinel et al. | |
| 2005/0049886 A1 | 3/2005 | Grannan et al. | |
| 2005/0129379 A1 | 6/2005 | Reagan et al. | |
| 2005/0216584 A1 | 9/2005 | Chisholm | |
| 2005/0271064 A1* | 12/2005 | Chang et al. | 370/397 |
| 2005/0281526 A1 | 12/2005 | Vongseng et al. | |
| 2005/0286517 A1 | 12/2005 | Babbar et al. | |
| 2006/0002324 A1 | 1/2006 | Babbar et al. | |
| 2006/0026111 A1 | 2/2006 | Athelogou et al. | |
| 2006/0026228 A1 | 2/2006 | Kim | |
| 2006/0047791 A1 | 3/2006 | Bahl | |
| 2006/0050862 A1 | 3/2006 | Shen et al. | |
| 2006/0085532 A1 | 4/2006 | Chu et al. | |
| 2006/0277603 A1 | 12/2006 | Kelso et al. | |
| 2007/0058538 A1 | 3/2007 | Chiang et al. | |
| 2007/0058638 A1 | 3/2007 | Guichard et al. | |
| 2007/0061458 A1 | 3/2007 | Lum | |
| 2007/0168547 A1 | 7/2007 | Krywaniuk | |
| 2007/0174522 A1 | 7/2007 | Lee | |
| 2007/0203999 A1 | 8/2007 | Townsley et al. | |
| 2007/0286198 A1 | 12/2007 | Muirhead et al. | |
| 2008/0002720 A1 | 1/2008 | Chao et al. | |
| 2008/0140495 A1 | 6/2008 | Bhamidipaty et al. | |
| 2008/0162609 A1 | 7/2008 | Bigian et al. | |
| 2008/0219281 A1 | 9/2008 | Akin et al. | |
| 2008/0285569 A1 | 11/2008 | Stademann et al. | |
| 2009/0019137 A1 | 1/2009 | Mishra et al. | |
| 2009/0019164 A1 | 1/2009 | Brown et al. | |
| 2009/0119280 A1 | 5/2009 | Waters et al. | |
| 2011/0161360 A1 | 6/2011 | Lundstrom | |

FOREIGN PATENT DOCUMENTS

| | | |
|---|---|---|
| GB | 2 069 767 | 1/1981 |
| KR | 2001/0038481 | 5/2001 |
| WO | WO9534975 A1 | 12/1995 |
| WO | WO9826549 A1 | 6/1998 |
| WO | WO 00 60864 | 10/2000 |
| WO | WO 02/35797 | 5/2002 |
| WO | WO 2008/068316 | 6/2008 |
| WO | WO 2008/113852 | 9/2008 |
| WO | WO 2008/113854 | 9/2008 |
| WO | WO2009007327 A1 | 1/2009 |
| WO | WO 2009/019300 | 2/2009 |
| WO | WO 2009/027513 | 3/2009 |
| WO | WO 2009/035719 | 3/2009 |
| WO | WO 2009/047215 | 4/2009 |
| WO | WO 2009/047334 | 4/2009 |

OTHER PUBLICATIONS

European Search Report issued in EP Application 07104707, Publication 1973269, dated Aug. 27, 2007, 7 pages.

Bodzinga, Anne, et al., "Interworking IPTV Services with IMS", Telecommunications Network Strategy and Planning Symposium 2006 pp. 1-5.

Cohen, Reuven, et al., "Video-on-Demand Session Management", IEEE Journal on Selected Areas in Communications vol. 14, No. 6, 1996.

European Search Report issued in EP Application 06125497, Publication 1931085, mailed Jan. 9, 2009, 8 pages.

International Search Report and Written Opinion for PCT/EP2008/053369, mailed Jul. 2, 2008, 10 pages.

International Search Report and Written Opinion for PCT/EP2008/060384, mailed Nov. 11, 2008, 10 pages.

International Search Report and Written Opinion for PCT/EP2008/061403, mailed Dec. 18, 2008, 12 pages.

International Search Report and Written Opinion for PCT/EP2007/063467, mailed Mar. 4, 2008, 7 pages.

International Search Report for PCT/EP2008/053374, mailed Sep. 25, 2009, 3 pages.

(56) References Cited

OTHER PUBLICATIONS

International Search Report and Written Opinion for PCT/EP2008/056563, mailed Aug. 21, 2008, 11 pages.
International Search Report for PCT/EP2008/063667, mailed Jul. 30, 2009, 3 pages.
International Search Report for PCT/EP2008/063639, mailed Oct. 1, 2009, 2 pages.
International Search Report for PCT/EP2008/063270, mailed Jan. 21, 2009, 3 pages.
Pezeshki, Ali et al., "A network for recursive extraction of canonical coordinates" Neural Networks 16 (2003) 801-808.
European Search Report issued in EP Application No. 07118408, completed Jul. 23, 2008, 8 pages.
Patrick, M., "DHCP Relay Agent Information Option", Motorola BCS, Jan. 2001, 16 pages.

* cited by examiner

OPTICAL DATA COMMUNICATIONS

TECHNICAL FIELD

This invention relates to techniques for use in optical data communication networks. In particular, the invention relates to techniques for use in resolving differences in communication standards between devices in a network.

BACKGROUND ART

There are a number of different standards for data communication in networks. The most common form of network to which this invention relates is an Ethernet network. There are a number of communication standards which govern the speed at which data is transferred over such networks. Current Fast Ethernet networks operate at a theoretical maximum transmission speed of 100 Mbit/s. There are a number of standards for such communication, collectively known as 100BASE-T, such as 100BASE-TX (using two pairs of Cat 5 cable). Standards exist for transmission speeds of 10 Mbit/s to 1000 Mbit/s (1 Gbit/s) and above The usual form of physical link is a copper wire-based infrastructure. When two devices are connected by a copper wire Ethernet network, and operate at different speeds (standards), there is an Ethernet procedure called 'auto-negotiation' which allows the two devices to choose common transmission parameters such as speed and duplex mode to allow them to communicate. Auto-negotiation resides in the physical layer of the OSI model and is currently covered by the international standard IEEE 802.3ab.

Auto-negotiation operates by connected devices detecting failure of a data communication link and then exchanging data relating to the technology abilities of each device. Upon receipt of this information, the devices decide on a mode of operation based on a priority list which forms part of the standard, currently spanning 10 Mbit/s to 1 Gbit/s.

The possibility of auto-negotiation on copper wire networks means that it is possible to progressively upgrade the capabilities of the various devices connected while still permitting full operation of the network. In this respect, the technology is backward compatible.

It is also possible to implement Ethernet networks using optical fibre links. These can also be configured to operate at different speeds. However, current standards covering such networks do not include anything comparable to auto-negotiation and so are not backward compatible. This invention is intended to address this problem.

DISCLOSURE OF THE INVENTION

A first aspect of this invention comprises a method of communicating data between a network communication device and a data network which are connected to each other by means of an optical fibre data link, the method comprises the steps of:
within the device, monitoring the connection to detect data communication at a first standard, and either:
a) if data communication is detected at the first standard, establishing data communication between the network device and the data network using the first standard; or
b) if no data communication is detected at the first standard, monitoring the connection in the device to detect data communication at the second standard and if data communication is detected at the second standard, establishing data communication between the network device and the data network using the second standard.

Preferably, this comprises cycling connection monitoring of the device between the first standard and the second standard until communication is detected. After a predetermined period of time if no communication is detected at either standard, the step of monitoring the connection in the device is ceased.

Monitoring at one or more further standards may take place if no communication is detected on either the first or second standard.

Typically, the first, second and/or further standards are mutually incompatible such that a device operating at one standard cannot communicate with a device operating at one of the other standards.

Each standard may provide communication at a different speed, for example the first standard operating at 1 Gbit/s and the second standard operating at 100 Mbit/s.

Each standard also typically uses different coding algorithms.

A second aspect of the invention provides a communication device to provide access to a data network, comprising:
data communication means for communicating data to and from an optical fibre data link at a first or second standard; and
monitoring means to control the data communication means; characterized in that the monitoring means are configured so as to monitor the connection to detect data communication at a first standard, and either:
a) if data communication is detected at the first standard, apply the first standard to the data communication means such as data communication between the network device and the network uses the first standard; or
b) if no data communication is detected at the first standard, monitor the connection to detect data communication at the second standard and if data communication is detected at the second standard, apply the second standard to the data communication means such as data communication between the network device and the network uses the second standard.

The monitoring means preferably is configured to cycle connection monitoring at the first standard and at the second standard until communication is detected. The monitoring means may be configured to cease to operate after a predetermined period of time if no communication is detected at either standard.

The data communication means may also be capable of data communication at one or more further standards and the monitoring means monitors communication at the one or more further standards if no communication is detected on either the first or second standard.

A third aspect of the invention provides a system comprising at least first and second data communication devices connected by means of a fibre optic data link, at least one of which is a device according to the second aspect of the invention.

MODE(S) FOR CARRYING OUT THE INVENTION

Figure 1:
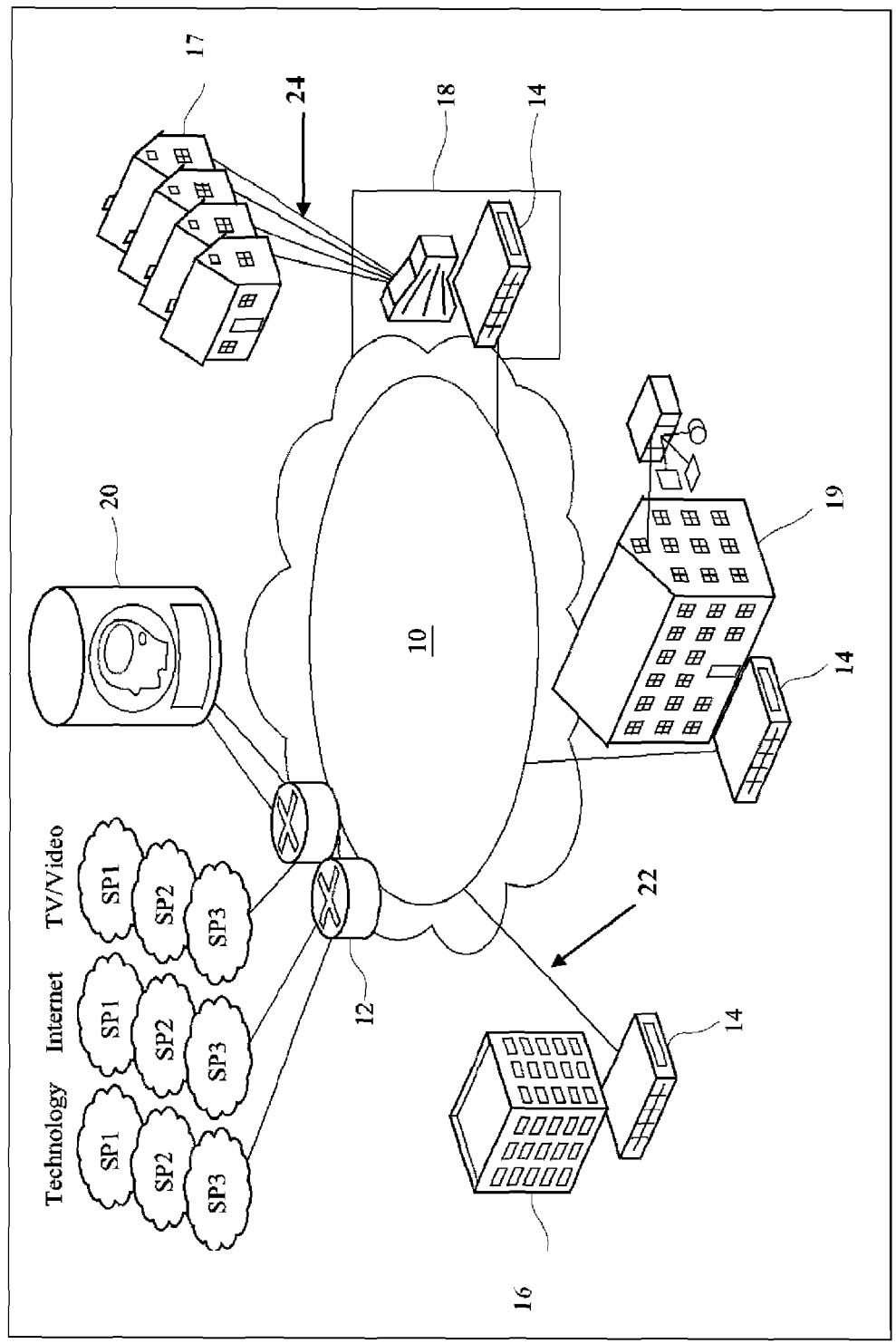
FIG. 1 shows a schematic diagram of a generic broadband network.

FIG. 1 shows a generic description of a broadband network for providing telephone, internet and TV/video services to subscribers in a number of locations. The present invention finds particular use in such systems. A series of service providers provide the various services (SP1, SP2, SP3) to the network 10 via conventional access points 12. The network 10 provides connection to these subscribers via routers 14 located close to the subscribers. These can include business locations that can include routers in commercial property 16, and domestic subscribers with routers located in a central office 18 for a neighbourhood of separate dwellings (houses 17), or in a single building such as an apartment. The network operator manages the network function by the use of a control and provisioning system 20. The present invention is particularly applicable to such networks.

The physical structure of the network comprises the routers 14 and other such devices connected by means of data cables 22. Each subscriber is provided with a local device (often called 'customer premise equipment' or 'CPE') that is connected to its respective router by a cable 24. In systems to which the present invention relates, the cables 22, 24 are optical fibre cables and data communication between the devices including routers 14 and CPE takes place via the appropriate standard. Common standards used in such cases are 100BASE-FX and 1000BASE-FX. These standards provide data transmission speeds equivalent to the corresponding copper wire standards 100BASE-T, 1000BASE-T.

The CPE can take a number of forms, for example the DRG range of devices from PacketFront of Sweden. Such devices include opto-electronic devices (data communication means) for the actual transmission and reception of signals under the control of a programmable control system (monitoring means) which forms part of the device. The software control is programmed to apply the selected standard when transmitting or receiving data. This includes the coding applied to the data for transmission or reception to or from the connected device.

In previous systems, the devices have been provided with a set standard programmed, for example 100BASE-FX, for fast Ethernet communications. For example, if a router 14 is programmed to operate at 100BASE-FX, under normal conditions, the connected CPE must also operate at 100BASE-FX. Connecting a CPE programmed to operate at 1000BASE-FX will not work (and vice versa). This means that it would be necessary to upgrade both the routers and the CPEs if it was desired to upgrade the performance of that section of the network to 1000BASE-FX. This can make the process expensive for the network operators and the subscribers. In this normal case, there is no way to install upgraded equipment in only part of the network while continuing to run at the old rate until there is sufficient upgraded equipment in use to justify a system level upgrade.

This invention is based on the ability of the connected equipment to be controlled to operate at two or more standards. This is particularly the case when the operation is under software control. By programming the device to monitor the data connection and switch to another standard when no communication is detected, the device can be made to hunt for the appropriate standard and operate at this until a change is detected.

Figure 2:
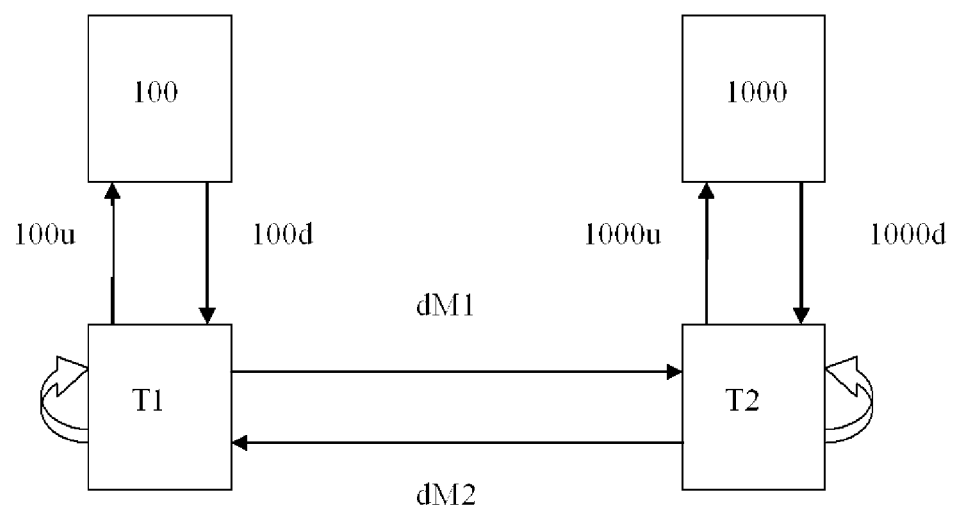
FIG. 2 shows a schematic view of the operation of a device according to an embodiment of the invention.

FIG. 2 shows schematically the steps executed in the device when connected to a network so as to implement the invention. When first connected, the device tests first T1 for a connection at a first speed (e.g. 100 Mbps) 100, checking downlink 100*d* connections on the connected cable (checking of the uplink 100*u* may also be possible using Ethernet loopback OAMs and receiving the correct link symbols). If up and down links are detected, communication is established at this speed and continues until the device is again caused to establish a link (e.g. following a restart, disconnection, etc.).

If no link is detected at the first speed, the device changes mode dM1 and initiates a test T2 at a second speed (e.g. 1 Gbps) 1000, again checking uplink 1000*u* and downlink 1000*d* connections. Again if up and down links are detected, communication is established at this speed and continues until the device is again caused to establish a link (e.g. following a restart, disconnection, etc.).

If no link is detected at this second speed, the device again changes mode dM2 and returns to the first speed operation for testing the link T1.

The link test runs for a predetermined period and if no link is detected, it times out. The device will cycle between the two speeds until a link is detected or until a predetermined time has elapsed at which time it ceases. In most cases, only one device will incorporate the invention. However, where two devices incorporating this invention are connected, there is a risk that their cycling can be permanently out of phase so that they never reach a situation where both are using the same speed. In this case, no communication would ever be detected. This can be avoided by randomising the timeout so that each device has a different timeout period.

The two speeds given here describe the common case for optical fibre connections at 100BASE-FX and 1000BASE-FX which may be encountered in domestic CPE connections to a broadband network. However, any two operating speeds can be selected. Alternatively, more than two options can be available, the device cycling through the options in a predetermined order or in a random order (which may also assist in avoiding the situation where two devices are out of phase when cycling through the options so that they never achieve a matching speed).

This invention is best embodied in physical layer equipment under software control. Such devices are capable of monitoring link status and configuring operation speed of the device so as to enable operation at the appropriate speed. It is only necessary for one end point of the final link to have the capability of the invention. In most cases, this is the CPE since it allows progressive upgrades of CPE installations before the whole network is reconfigured to operate at another speed.

Other changes can be made within the scope of the invention.

The invention claimed is:

1. A method of communicating data between a network device and a data network to which the device is connected via an optical fiber data link, the method comprising:
   connecting the device to the optical fiber data link; and
   monitoring the connection during a first interval in the device to detect data communication at a first standard T1 and not to detect data communication at a second standard T2 during the first interval, and
   if no data communication is detected at the first standard T1 during the first interval, monitoring the connection during a second interval in the device to detect data communication at a second standard T2 and not to detect data communication at the first standard T1 during the second interval, and if data communication is detected at the second standard T2, establishing data communication between the network device and the data network using the second standard T2;
   wherein the method further comprises at least one of randomising a timeout period for monitoring the connection and cycling connection monitoring of the device between the first standard T1 and the second standard T2 in a random order.

2. A method as claimed in claim 1, comprising cycling the device between monitoring at the first standard T1 and at the second standard T2 until communication is established.

3. A method as claimed in claim 2, wherein the device ceases to monitor communications after a predetermined period of time if no communication is detected at either standard.

4. A method as claimed in claim 1, further comprising monitoring at one or more further standards if no communication is detected on either the first standard T1 or the second standard T2.

5. A method as claimed in claim 1, wherein the first standard T1, the second standard T2 and/or further standards are mutually incompatible such that a device operating at one standard cannot communicate with a device operating at one of the other standards.

6. A method as claimed in claim 5, wherein each standard provides communication at a different speed.

7. A method as claimed in claim 5, wherein each standard uses different coding algorithms.

8. A method as claimed in claim 1, wherein each standard provides communication at a different speed.

9. A method as claimed in claim 8, wherein the first standard T1 operates at 1 Gbit/s and the second standard T2 operates at 100 Mbit/s.

10. A method as claimed in claim 1, wherein each standard uses different coding algorithms.

11. A communication device for connection to a data network via an optical fiber data link, comprising:
data communication means for communicating data to and from the data link at a first standard T1 or a second standard T2; and
monitoring means connected to the data link to detect communication at the first standard T1 or the second standard T2;
wherein the monitoring means are configured to monitor the connection during a first interval to detect data communication at the first standard T1 and not to detect data communication at a second standard T2 during the first interval, and
only if no data communication is detected at the first standard T1, the monitoring means are configured to monitor the connection during a second interval to detect data communication at the second standard T2 and not to detect data communication at the first standard T1 during the second interval, and if data communication is detected at the second standard T2, the data communication means are configured to establish data communication between the network device and the data network using the second standard T2, wherein the communication device is configured to randomise a timeout period for monitoring the connection , or to cycle connection monitoring of the device between the first standard T1 and the second standard T2 in a random order.

12. A device as claimed in claim 11, wherein the monitoring means are configured to cycle connection monitoring at the first standard T1 and at the second standard T2 until communication is detected.

13. A device as claimed in claim 12 wherein the monitoring means are configured to cease to operate after a predetermined period of time if no communication is detected at either standard.

14. A device as claimed in claim 11, wherein the data communication means is configured for data communication at one or more further standards and the monitoring means are configured to monitor communication at the one or more further standards if no communication is detected on either the first standard T1 or the second standard T2.

15. A system comprising at least first and second data communication devices connected via a fiber optic data link, at least one of the first and second data communication devices being a device as claimed in claim 11.

16. A system as claimed in claim 15, wherein the first data communication device operates at only one of the first, second or further standards.

17. A system comprising at least first and second data communication devices, the first and second data communication devices each being a device as claimed in claim 11, each device being configured to monitor to detect data communication at the first standard T1 or the second standard T2 for a different period of time.

* * * * *